United States Patent [19]
Cook et al.

[11] Patent Number: 5,400,661
[45] Date of Patent: Mar. 28, 1995

[54] MULTI-AXIS FORCE PLATFORM

[75] Inventors: Nathan H. Cook, North Eastham; Forest J. Carignan, Bedford, both of Mass.

[73] Assignee: Advanced Mechanical Technology, Inc., Watertown, Mass.

[21] Appl. No.: 65,556

[22] Filed: May 20, 1993

[51] Int. Cl.$^6$ .............................. G01L 5/00
[52] U.S. Cl. .................. 73/862.043; 73/862.041
[58] Field of Search ............... 73/862.041, 862.042, 73/862.043, DIG. 3; 177/DIG. 5, 187, 189, 210 EM

[56] References Cited

U.S. PATENT DOCUMENTS

| | | | |
|---|---|---|---|
| 2,410,653 | 11/1946 | Hem | 73/65.01 |
| 2,630,504 | 3/1953 | Burch et al. | 200/67 |
| 3,288,541 | 11/1966 | Tracy | 308/2 |
| 3,384,424 | 5/1968 | Raines | 308/2 |
| 3,575,054 | 4/1971 | Glista | 73/DIG. 3 |
| 4,340,877 | 7/1982 | Herden | 338/42 |
| 4,428,225 | 1/1984 | Kato et al. | 73/65.01 |
| 4,484,173 | 11/1984 | Everett | 338/42 |
| 4,493,220 | 1/1985 | Carignan et al. | 73/862.66 |
| 4,765,421 | 8/1988 | Newton et al. | 177/DIG. 5 |
| 4,778,017 | 10/1988 | Liang | 177/187 |
| 4,805,637 | 2/1989 | Walthert | 73/65.01 |
| 5,186,062 | 2/1993 | Roost | 73/862.041 |

FOREIGN PATENT DOCUMENTS

| | | |
|---|---|---|
| 0014460 | 8/1980 | European Pat. Off. |
| 0069073 | 1/1983 | European Pat. Off. |
| 3009091 | 9/1981 | Germany |

OTHER PUBLICATIONS

"Integrated and Discrete Semiconductors" product brochure, Allegro MicroSystems, Inc., (2 pages), (published at least by Jan. 1992).
"OR6-5 Series Bulletin #OR65-289", AMTI, (1989).
"FD-1/FD-2, High-Output Tension/Compression Load Cells", (4 pages), (Spring 1993).
"Hall Effect Transducers", Micro Switch, p. 176, (1982).
"FD1" product information, AMTI, (2 pages), (published at least by Sep. 1991).

Primary Examiner—Richard F. Chilcot, Jr.
Assistant Examiner—R. Biegel
Attorney, Agent, or Firm—Hamilton, Brook, Smith & Reynolds

[57] ABSTRACT

A multi-axis force platform for determining forces and moments exerted on the platform along x, y and z axes includes at least one multi-axis spring. The multi-axis spring includes a block of rigid material through which a pattern of slots pass through to form a series of deflectable beams separated from each other by the slots. The deflectable beams surround an interior region of the spring and elastically couple the interior region of the spring to an outer region of the spring such that the interior region can deflect relative to the outer region along x, y and z axes when subjected to a load. One or more magnetic sensors are positioned within the interior region of the spring for sensing loads exerted on the spring.

27 Claims, 6 Drawing Sheets

MULTI-AXIS FORCE PLATFORM

BACKGROUND

Force platforms are commonly used for research and clinical studies in such fields as biomechanics, medical research, orthopedics, rehabilitation evaluation, prosthetic uses and engineering. A force platform can measure the amount of sway in a person's stance while the person stands on the platform. Force platforms accomplish this by measuring three orthogonal force components along the x, y and z axes as well as moments about those axes.

One recent proposed use of force platforms is for determining high lead levels in children. The amount of swaying in the child's stance while standing on the force platform is determined by measuring the force components along the x, y and z axes as well as the moments about those axes. An appropriate signature analysis of the child's swaying is indicative of high lead levels.

Many force platforms include multi-axis spring members upon which a series of strain gauges are fixed for sensing loads along multiple axes. Electrical signals from the strain gauges are transmitted to an external amplifier which amplifies the signals to a sufficient voltage for processing in a computer.

SUMMARY OF THE INVENTION

One problem with force platforms which utilize strain gauges is that the addition of an external amplifier greatly increases the cost of the system. Additionally, the multi-axis springs utilized in current force platforms have a fixed but not necessarily optimal x or y axis to z axis output. Furthermore, these current multi-axis springs can be damaged if overloaded because they lack overload protection. Accordingly, there is a need for a force platform which does not require an external amplifier. There is also a need for a force platform having multi-axis springs which have reasonable strength along all three axes and cannot be damaged when overloaded while at the same time having a relatively low spring constant with an accompanying high sensitivity along the x and y axes.

The present invention provides an apparatus for sensing loads along multiple axes. The apparatus includes a multi-axis spring capable of deflecting along multiple axes while under load. The spring has a first region for receiving loads which is elastically coupled to a second region of the spring. The first region of the spring is capable of deflecting relative to the second region of the spring along multiple axes while under a load. A first magnet for producing a first magnetic field is affixed relative to one region of the spring. A magnetic sensor affixed relative to another region of the spring is positioned proximate to the first magnet and senses loads exerted on the spring by sensing the magnetic field produced by the first magnet. The intensity of the magnetic field varies with varying distance from the first magnet which varies depending upon the load exerted on the spring. The sensor provides output signals in response to the intensity of the sensed magnetic field which is proportional to the distance from the magnets.

In preferred embodiments, loads are applied to the apparatus upon a platform which transfers the load to the first or interior region of the spring. A base supports the second or outer region of the spring. A second magnet for producing a second magnetic field is positioned apart from the first magnet and is affixed relative to the same region of the spring as the first magnet. The first and second magnetic fields produces a resultant magnetic field having an intensity which is sensed by a series of magnetic sensors positioned proximate to the magnets. The series of magnetic sensors provides output signals in response to the intensity of the sensed magnetic field which is proportional to the distance of the magnetic sensors from the magnets. The preferred embodiment of the load sensing apparatus described above includes multi-axis springs of the design described below.

In operation, a load is applied to the platform of the apparatus which transfers the load to the first region of the spring. The load deflects the spring such that the first region of the spring moves relative to the second region of the spring. This varies the distance between the magnets and each magnetic sensor which, as a result, varies the magnetic field sensed by each magnetic sensor. The sensors provide signals having magnitudes indicative of the measured magnetic field. The magnitude of the signals provided by each magnetic sensor is then correlated into the load exerted on the spring as well as the direction in which the load is directed along the x, y and z axes. In addition, moments about the x, y and z axes can be calculated once plural magnitudes and directions of the loads are determined.

The signals provided by the magnetic sensors in the present invention are of sufficient voltage to be processed in a computer without high gain amplification. Therefore, an external amplifier is not required to operate the present invention load sensing apparatus.

The present invention also provides a multi-axis spring which is formed from a block of rigid material. A pattern of slots passes through the block to form a series of deflectable beams separated from each other by the slots. The series of deflectable beams surround a first region of the spring and elastically couple the first region to a second region of the spring such that the first region is capable of deflecting relative to the second region of the spring along multiple axes while under a load.

In preferred embodiments, each deflectable beam has a plurality of straight sections in which a right angle is formed. The first or interior region of the spring is capable of deflecting along the x, y and z axes relative to the second or outer region of the spring. The multi-axis spring has spring constants in the x and y axis which are equal to each other and a spring constant along the z axis which is typically greater than the spring constants along the x and y axes. For example, the ratio of the spring constant in the z axis to the spring constant in the x or y axis can be 10:1.

The multi-axis spring is protected from being overloaded in the x and y directions in that movement of the first region of the spring relative to the second region is prevented once the beams have deflected enough to close the gaps between each other such that the first region and the beams are compressed against the second region of the spring. Overload protection in the z direction can be provided by securing the second region of the multi-axis spring to a base such that a gap exists between the first region of the spring and the base. The gap between the base and the first region of the spring provides overload protection in the z direction by preventing further movement of the first region relative to the second region when the first region bottoms out on the base footing.

The present invention provides a multi-axis load sensing apparatus which can measure loads along 3 axes and moments about 3 axes without the need for an external amplifier. Additionally, the present invention multi-axis spring provides a multi-axis spring having overload protection which has low spring constant in the x and y directions and a higher spring constant in the z direction which can be 10 times greater than the spring constant in the x and y directions.

BRIEF DESCRIPTION OF THE DRAWINGS

The foregoing and other objects, features and advantages of the invention will be apparent from the following more particular description of preferred embodiments of the drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENT

Figure 1:
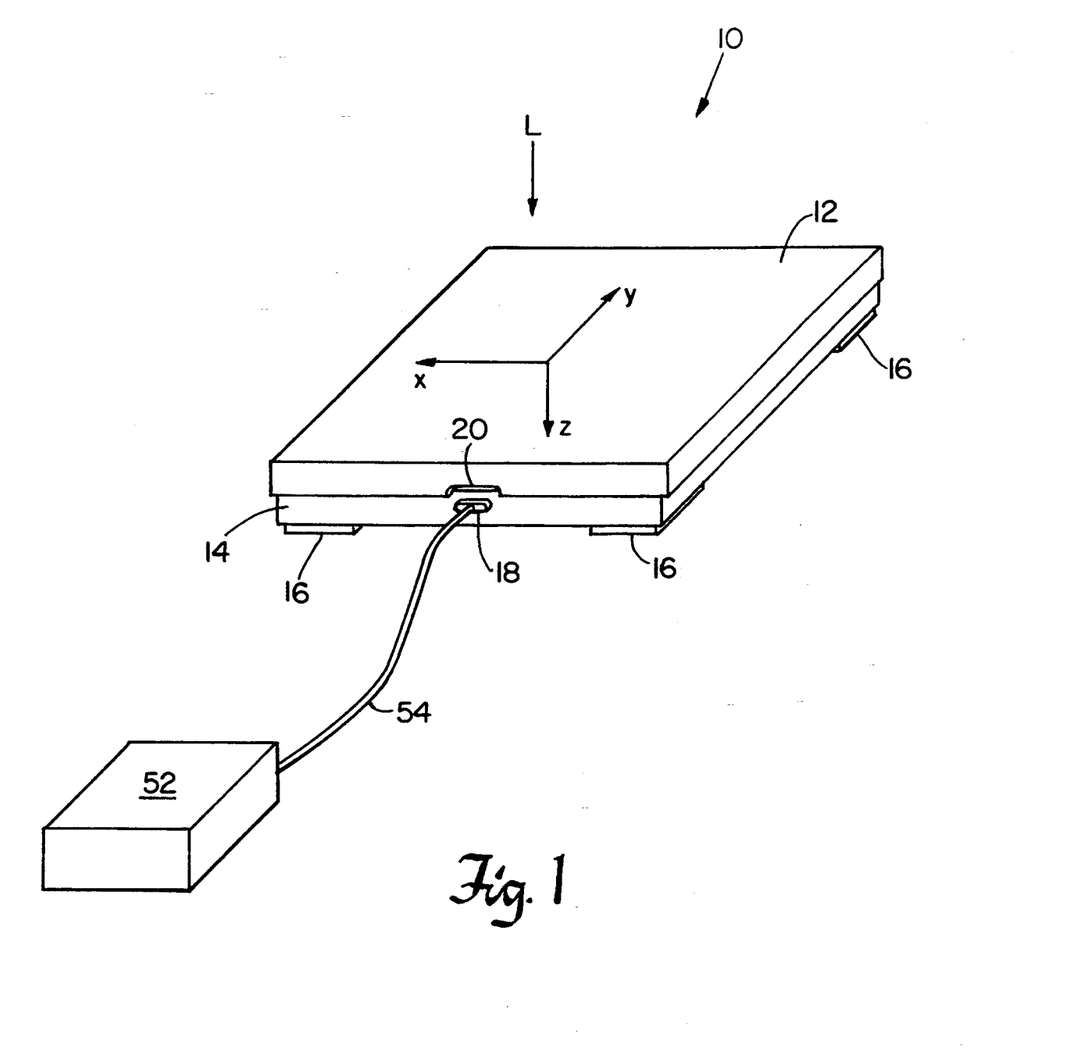
FIG. 1 is a perspective view of the present invention multi-axis force platform.
Figure 2:
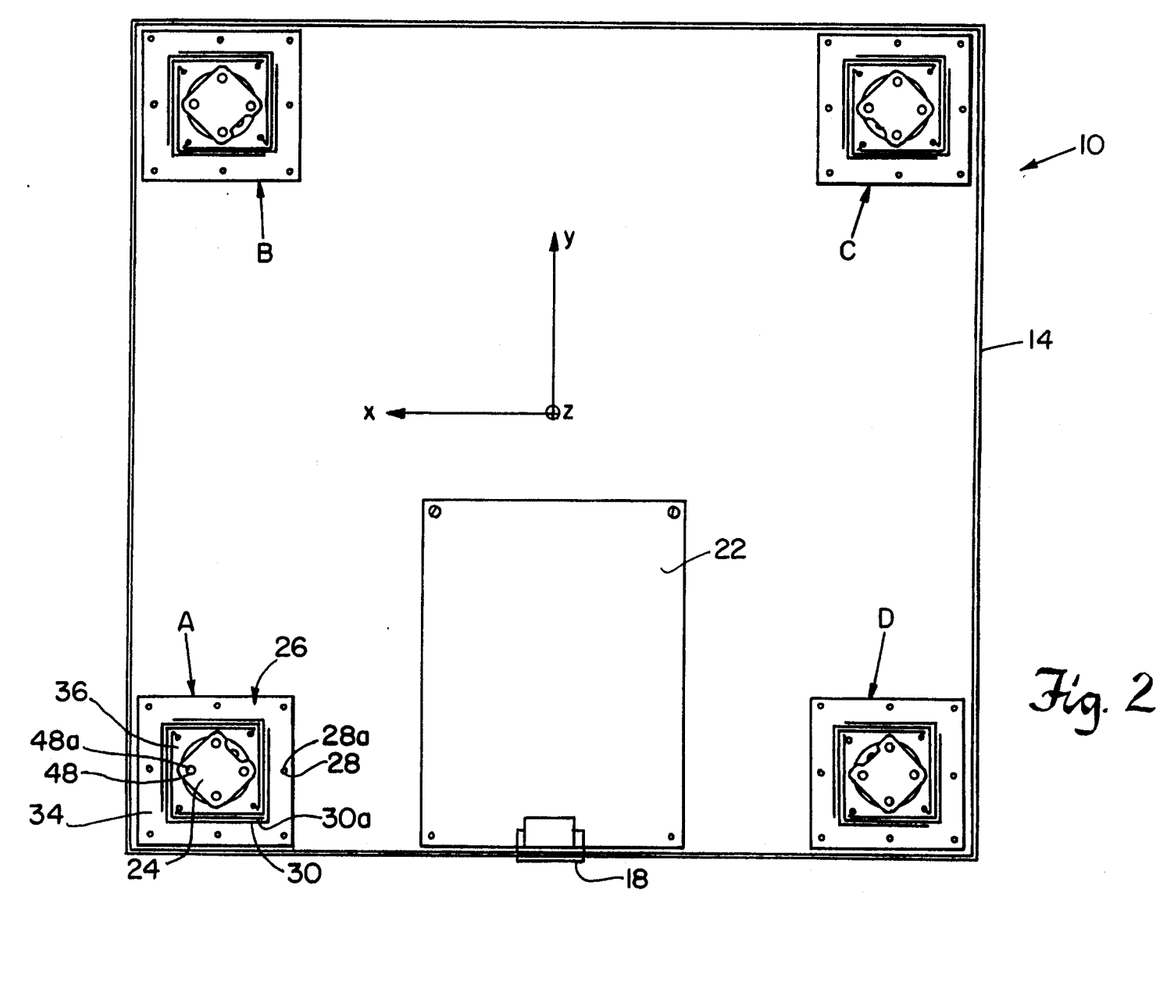
FIG. 2 is a plan view of the present invention force platform with the top platform removed.
Figure 3:
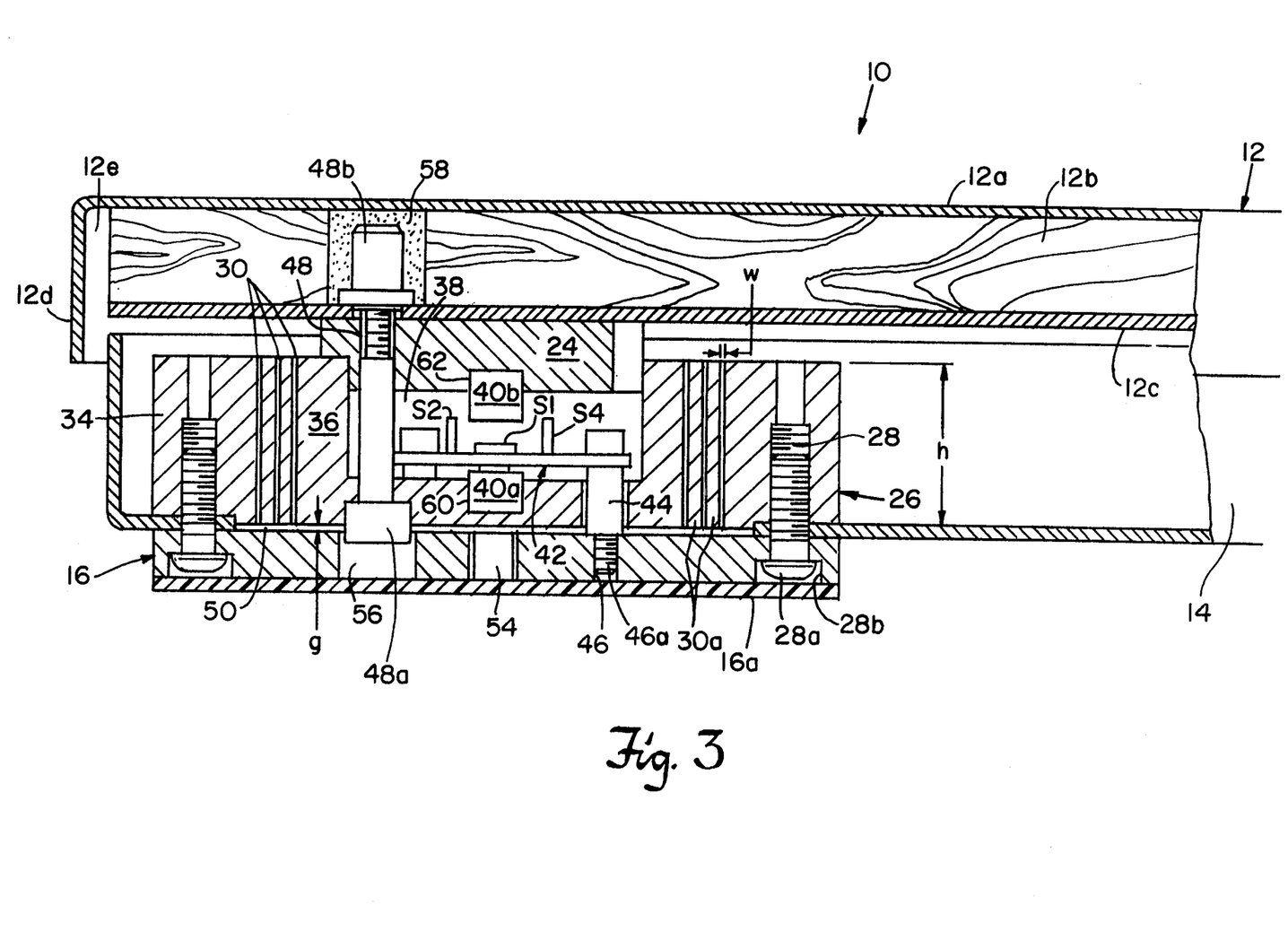
FIG. 3 is a partial sectional view of a portion of the force platform.

In FIG. 1, force platform 10 includes a top platform 12 for receiving loads in the x, y and z directions. Top platform 12 provides a flat surface on which a person can stand and is supported by four multi-axis springs 26 at positions A, B, C and D (FIG. 2). The interior region 36 of each spring 26 (FIGS. 3 and 4) is secured to the top platform 12. The interior region 36 of spring 26 is elastically coupled to an outer region 34 by a series of deflectable beams 30a. The springs 26 are housed within an enclosure 14 and secured to enclosure 14 at the outer region 34 of spring 26 (FIGS. 2 and 3). Four base feet 16 (FIGS. 1 and 3) support enclosure 14 and are bolted to the bottom of enclosure 14 and the outer region 34 of spring 26.

Magnets 40a and 40b are affixed relative to the interior region 36 within cavity 38. Magnets 40a and 40b produce a magnetic field having an intensity which varies with distance from magnets 40a and 40b. Each spring 26 has a circuit board 42 containing magnetic sensors S1, S2, S3, S4 and S5 (FIGS. 3 and 4) which are positioned between magnets 40a and 40b within cavity 38 and affixed to a base foot 16. The magnetic sensors S1, S2, S3, S4 and S5 sense the magnetic field produced by magnets 40a and 40b and produce output signals in response to the intensity of the magnetic field sensed. The signals produced by magnetic sensors S1, S2, S3, S4 and S5 are processed by circuit board 22. A connector 18 and cable 54 electrically connects computer 52 with circuit board 22 for further processing signals received from circuit board 22. In addition, cable 54 also provides power to force platform 10.

Figure 4:
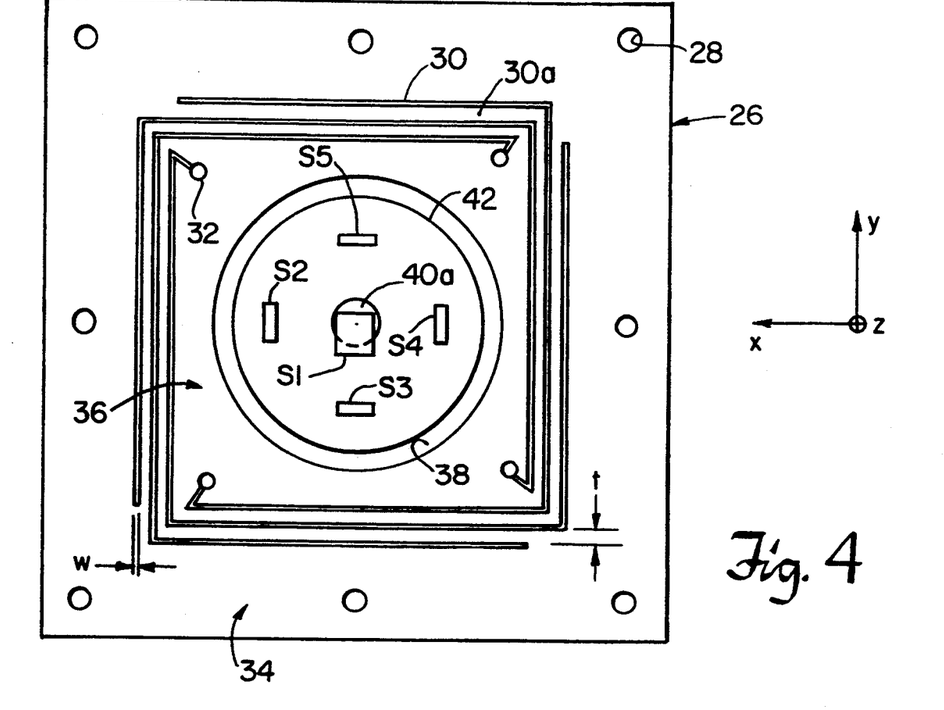
FIG. 4 is a plan view of the present invention multi-axis spring.

In operation, a load L is exerted upon top platform 12 which is generally provided by a person standing on top platform 12 (FIG. 1). Load L can have a combination of x, y and z force components. Top platform 12 transfers the load evenly upon the interior region 36 of the multi-axis springs 26 located at A, B, C and D (FIGS. 2 and 3). The transferred load deflects the beams 30a of each spring 26 and moves the interior region 36 relative to the outer region 34. This movement can be in the x, y or z axis, or along all three axes. The relative movement of interior region 36 to outer region 34 moves magnets 40a and 40b relative to magnetic sensors S1, S2, S3, S4 and S5 (FIGS. 3 and 4). This varies the distance of magnetic sensors S1, S2, S3, S4 and S5 from magnets 40a and 40b, thereby varying the intensity of the magnetic field sensed by each magnetic sensor. Each magnetic sensor S1, S2, S3, S4 and S5 produces a signal whose magnitude is relative to the intensity of the magnetic field sensed. Therefore, the magnitude of the signals produced by the magnetic sensors is indicative of the amount that interior region 36 has deflected relative to outer region 34. The signals are then correlated to the load exerted upon each multi-axis spring 26. By adding all the forces exerted upon each spring 26 at A, B, C and D, the total magnitude of load L as well as the direction of the load L along the x, y and z axes can be determined. In addition, by adding and subtracting load components upon spring locations A, B, C and D, moments about the x, y and z axes of force platform 10 can be determined.

A more complete description of force platform 10 is as follows. Referring to FIG. 3, a base foot 16 is bolted to each bottom corner of enclosure 14 and the outer region 34 of each spring 26 by screws 28a and tapped holes 28 (FIG. 2). Counterbored hole 28b allows the head of screws 28a to be recessed within each base foot 16. A machined step on the bottom of each spring 26 fits into hole 50 within each bottom corner of enclosure 14 to provide a gap "g" between each base foot 16 and the interior region 36 of each spring 26. Gap "g" can be, for example, 0.010 inches which provides spring 26 with limited movement in the z direction, thereby, providing spring 26 with overload protection. When overloaded, interior region 36 will bottom out on base foot 16 thereby, preventing further movement of interior region 3b relative to outer region 34 along the z axis which can cause damage to spring 26. Cushion 16a is a rubber pad which is adhered to the bottom surface of base foot 16 to cushioned base foot 16 as well as to prevent contaminants from entering force platform 10.

In the preferred embodiment, enclosure 14 and base 16 are made of aluminum. However, alternatively, other suitable materials can be used such as steel, plastics or composites.

Top platform 12 has a plywood core 12b which is laminated with epoxy between two sheets of aluminum 12a and 12c respectively. A flange 12d extends downward from aluminum sheet 12a over the edge of plywood core 12b and overlaps enclosure 14, thereby enhancing esthetics and preventing contaminants from entering force platform 10. Space 12e between flange 12d and plywood core 12b is filled with epoxy. Alternatively, top platform 12 can be made of a solid aluminum plate or other suitable materials.

The interior region 36 of each spring 26 is secured to top platform 12 by bolts 48a. Bolts 48a pass through clearance holes 56 in base 16, clearance holes 48 in top magnet holder 24 and are fastened to inserts 48b. Inserts 48b are threaded sheet metal inserts which are epoxied within cavities 58. In the preferred embodiment, four bolts 48a secure the interior region 36 to top magnet holder 24 and top platform 12 (FIG. 2). Alternatively, any suitable number of bolts 48a can be employed.

Bottom magnet 40a is held within a recess 60 at the bottom of cavity 38 in interior region 36. Top magnet 40b is positioned within recess 62 in top magnet holder 24 above and spaced apart from bottom magnet 40a. Top magnet holder 24 affixes top magnet 40b relative to the interior region 36 of spring 26.

A circuit board 42 is positioned within cavity 38 of each spring 26 and is secured to a base foot 16 and the outer region 34 of spring 26 by a series of screws 46a, spacers 44 and tapped holes 46. Magnetic sensors S1, S2, S3, S4 and S5 (FIG. 4) are fixed to circuit board 42. Sensors S2, S3, S4 and S5 form two pairs of upright opposing sensors located on opposite sides of magnets 40a and 40b. Sensor S5 lies flat upon circuit board 42 and is positioned between magnets 40a and 40b. The configuration of sensors S1, S2, S3, S4 and S5 upon circuit board 42 allows the sensors to sense changes in magnetic field intensity when magnets 40a and 40b are moved relative to the sensors along the x, y or z axes.

Sensors S2 and S4 sense changes in magnetic field intensity along the x axis while sensors S3 and S5 sense changes along the y axis. In addition, sensor 1 senses changes in magnetic field intensity along the z axis.

Referring to FIG. 4, multi-axis spring 26 consists of a block of aluminum through which a series of U-shaped slots 30 are cut to form a series of L-shaped deflectable beams 30a which elastically couple the interior region 36 to the outer region 34. The angles in deflectable beams 30a provide the deflectable beams 30a with greater length and deflection capability than if straight beams were employed. The width "w" of each slot 30 can be for example 0.014 inches wide but can be made wider (for example 0.025 inches) in order to provide interior region 36 with greater movement along the x and y axes before the beams 30a compress against each other and bottom out. Movement of the interior region 36 is limited by the width "w" of the slots 30 and provides overload protection for spring 26 in the xy plane.

In the preferred embodiment, the slots 30 are machined through an electrical discharge machining process by a wire type electrical discharge machine (wire EDM) in which a machining wire from the EDM machine is passed through holes 32 in order to begin the slots 30. Although four slots 30 are shown in FIG. 4, the number of slots 30 can vary. Additionally, the beams 30a are shown to be of equal thickness "t", height "h" (FIG. 3) and length but these parameters can be varied. The thickness "t" of each beam 30a as well as the height "h" of spring 26 is dependent upon the spring constant desired. Table 1 depicts beam thickness "t" of 0.0652 inches, 0.0787 inches and 0.0943 inches wide for spring heights h (FIG. 3) of 0.7 inches, 0.8 inches, 0.9 inches and 1 inch.

The spring constants of spring 26 in the x and y plane are equal in all directions as can be determined through a Mohr's circle analysis. However, the spring constant of spring 26 in the z direction can be ten times the spring constant in the x and y directions. This allows a heavy person (for example, 250 lbs) to stand on the platform without damaging or bottoming out spring 26 while at the same time measuring small forces (for example, 10 or 20 lbs) in the x and y directions.

Figure 5:
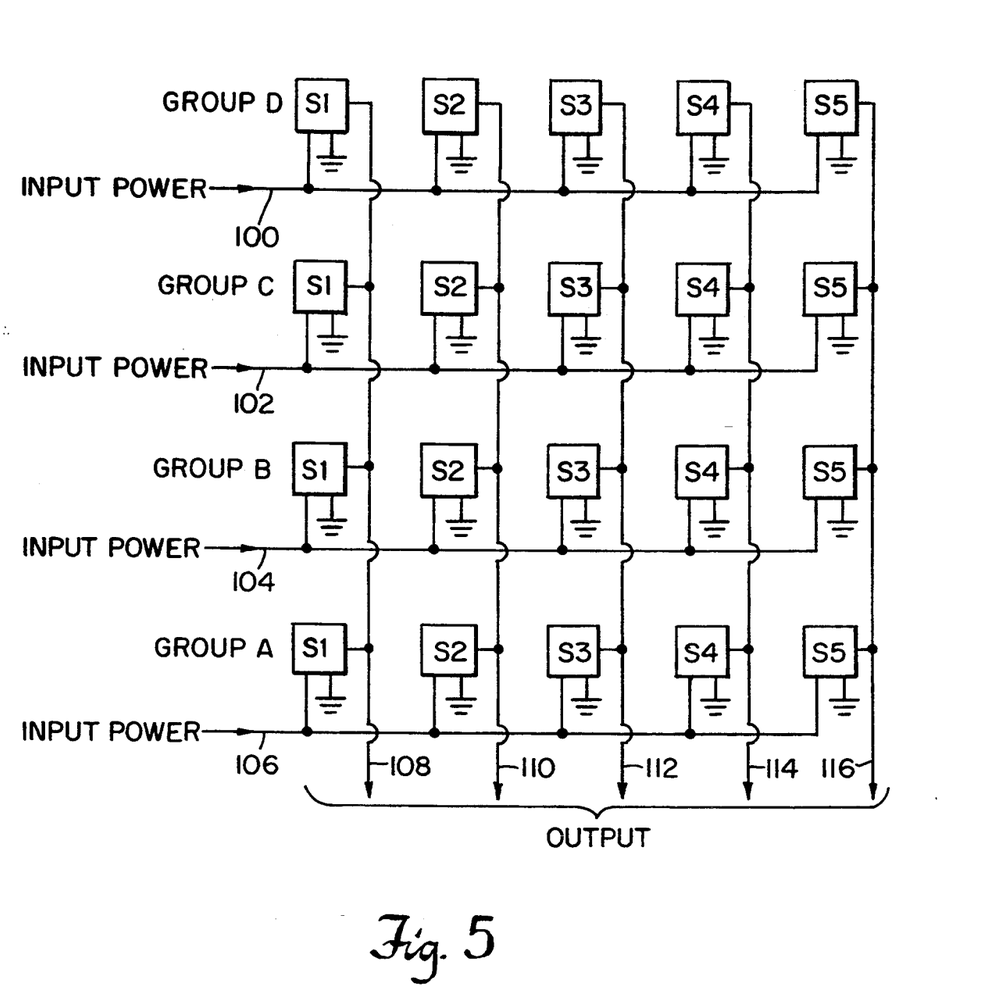
FIG. 5 is a schematic drawing of the electrical connections between the magnetic sensors.

The series of magnetic sensors S1, S2, S3, S4 and S5 (FIG. 4) located at A, B, C and D (FIG. 2) are electrically connected as shown in FIG. 5. Sensors S1, S2, S3, S4 and S5 of Group A are powered by line 106. Sensors S1, S2, S3, S4 and S5 of Group B are powered by line 104. Sensors S1, S2, S3, S4 and S5 of Group C are powered by line 102. Sensors S1, S2, S3, S4 and S5 in Group D are powered by line 100.

The outputs from each magnetic sensor S1 in Groups A, B, C and D are connected to output line 108. The outputs from each sensor S2 in Groups A, B, C and D are connected to output line 110. The outputs from each sensor S3 in Groups A, B, C and D are connected to output line 112. The output from each sensor S4 in Groups A, B, C and D are connected to output line 114. Finally, the outputs from each sensor S5 in Groups A, B, C and D are connected to output line 116.

Signals from output lines 108, 110, 112, 114 and 116 are transmitted to circuit board 22 which processes the signals and transmits the processed signals to computer 52 (FIG. 1) via connector 18 and cable 54. Circuit board 22 electrically zeros the output signals from each sensor with respect to zero load upon force platform 10. This is required because each magnetic sensor produces an output voltage in response to the sensed magnetic field when no loads are exerted on force platform 10. Additionally, circuit board 22 includes an analog to digital converter for converting the signals received from the magnetic sensors so that the signals can be processed by computer 52. Gains are assigned to the output signals from each sensor to compensate for any differences in the spring constants of the springs 26 located at A, B, C and D, or any differences between the sensors or magnets to ensure that the output signals from each magnetic sensor are uniform for a given load. The magnitude of the gains are determined by calibrating force platform 10.

Force platform 10 is calibrated by bolting force platform 10 to a calibration apparatus via the tapped holes 54 (FIG. 3) in each base foot 16. When calibrating force platform 10, a series of known loads are placed upon top platform 12 and gains are assigned to the outputs from each sensor S1, S2, S3, S4 and S5 located at A, B, C and D to compensate for the differences in spring constants, sensors and magnets.

As mentioned earlier, the magnitude of the signals produced by sensors S1, S2, S3, S4 and S5 located at A, B, C and D is correlated into the force exerted on force platform 10. The force on any given spring 26 at "n"

TABLE 1

| | .0652 Inch Thick Beam | | | 0.787 Inch Thick Beam | | | .0943 Inch Thick Beam | | |
|---|---|---|---|---|---|---|---|---|---|
| Spring Height (in) | Kz (lbs/in) | Kxy (lbs/in) | Kz/Kxy Ratio | Kz (lbs/in) | Kxy (lbs/in) | Kz/Kxy Ratio | Kz (lbs/in) | Kxy (lbs/in) | Kz/Kxy Ratio |
| 0.7 | 5408 | 533 | 10.15 | 5812 | 900 | 6.46 | 6935 | 1526 | 4.54 |
| 0.8 | 7745 | 615 | 12.59 | 8885 | 945 | 9.40 | 10511 | | |
| 0.9 | 10433 | 716 | 14.57 | 11587 | 1262 | 9.18 | 12821 | 1695 | 7.56 |
| 1.0 | 13887 | 823 | 16.87 | 14871 | 1355 | 10.97 | 16206 | 2386 | 6.79 | location (for example, n=either A, B, C or D) in the x direction is given by:

$$F_{nx} = -(G_{n4} \times V_{n4}) + (G_{n2} \times V_{n2})$$ Eq. 1 where:

$G_{n4}$=gain assigned to sensor 4 at any given spring location $G_{n2}$=gain assigned to sensor 2 at any given spring location $V_{n4}$=output of sensor 4 at any given spring location $V_{n2}$=output of sensor 2 at any given spring location The force exerted on any given spring 26 located at n in the y direction can be determined by:

$$F_{ny} = (G_{n5} \times V_{n5}) - (G_{n3} \times V_{n3})$$ Eq. 2 where:

$G_{n5}$=the gain assigned to sensor 5 at any given spring location $G_{n3}$=the gain assigned to sensor 3 at any given spring location $V_{n5}$=the output signal of sensor 5 at any given location $V_{n3}$=the output of sensor 3 at any given spring location The force exerted upon any given spring 26 located at n in the z direction is determined by:

$$F_{nz} = G_{n1} \times V_{n1}$$ Eq. 3 where:

$G_{n1}$=the gain assigned to sensor 1 at any given spring location $V_{n1}$=the output of sensor 1 at any given spring location The total force exerted upon force platform 10 in the x direction is determined by adding all the force components in the x direction found with Eq. 1 for each spring location A, B, C and D (FIG. 2) as follows:

$$F_{xTotal} = F_{Ax} + F_{Bx} + F_{Cx} + F_{Dx}$$ Eq. 4 where:

$F_{Ax}$, $F_{Bx}$, $F_{Cx}$ and $F_{Dx}$ are the x components of the force exerted on the springs 26 located at A, B, C and D.

The total force component which is exerted upon force platform 10 in the y direction is determined by adding all the force components in the y direction found with Eq. 2 for each spring location as follows:

$$F_{yTotal} = F_{Ay} + F_{By} + F_{Cy} + F_{Dy}$$ Eq. 5 where:

$F_{Ay}$, $F_{By}$, $F_{Cy}$, $F_{Dy}$, are the y components of the force exerted on the springs 26 located at A, B, C and D.

The total force exerted upon force platform 10 in the z direction is determined by adding all the z components of each spring 26 found with Eq. 3 at each location A, B, C and D as follows:

$$F_{zTotal} = F_{Az} + F_{Bz} + F_{Cz} + F_{Dz}$$

where:

$F_{Az}$, $F_{Bz}$, $F_{Cz}$, $F_{Dz}$ are the z components of the force exerted on the springs 26 located at A, B, C and D.

The moment about the x axis of force platform 10 can be determined with the following equation: (where l is the x or y distance from platform center to any spring)

$$M_x = (F_{Bz} + F_{Cz} - F_{Az} - F_{Dz}) \times l$$ Eq. 6

The moment about the y axis of force platform 10 can be determined with the following equation:

$$M_y = (F_{Cz} + F_{Dz} - F_{Az} - F_{Bz}) \times l$$ Eq. 7

The moment about the z axis of force platform 10 can be determined with the following equation:

$$M_z = (F_{Ax} + F_{Ay} - F_{Bx} + F_{By} - F_{Cx} - F_{Cy} + F_{Dx} - F_{Dy}) \times l$$ Eq. 8

The push-pull arrangement of employing opposing pairs of magnetic sensors doubles the output and cancels out cross talk. Alternatively, a single magnetic sensor can be employed to sense magnetic fields along each axis instead of employing opposing pairs of magnetic sensors. However, such an arrangement runs the risk of having higher cross talk.

The outer geometry of the outer region of multi-axis springs 26, 130 and 70 (FIGS. 4, 6 and 7) is shown to be rectangular but alternatively, other suitable geometries can be employed such as circular or polygonal geometries. Additionally, the pattern of deflectable beams can be polygonal, ranging anywhere between the triangular pattern of spring 70 to the spiral pattern of spring 130.

Figure 6:
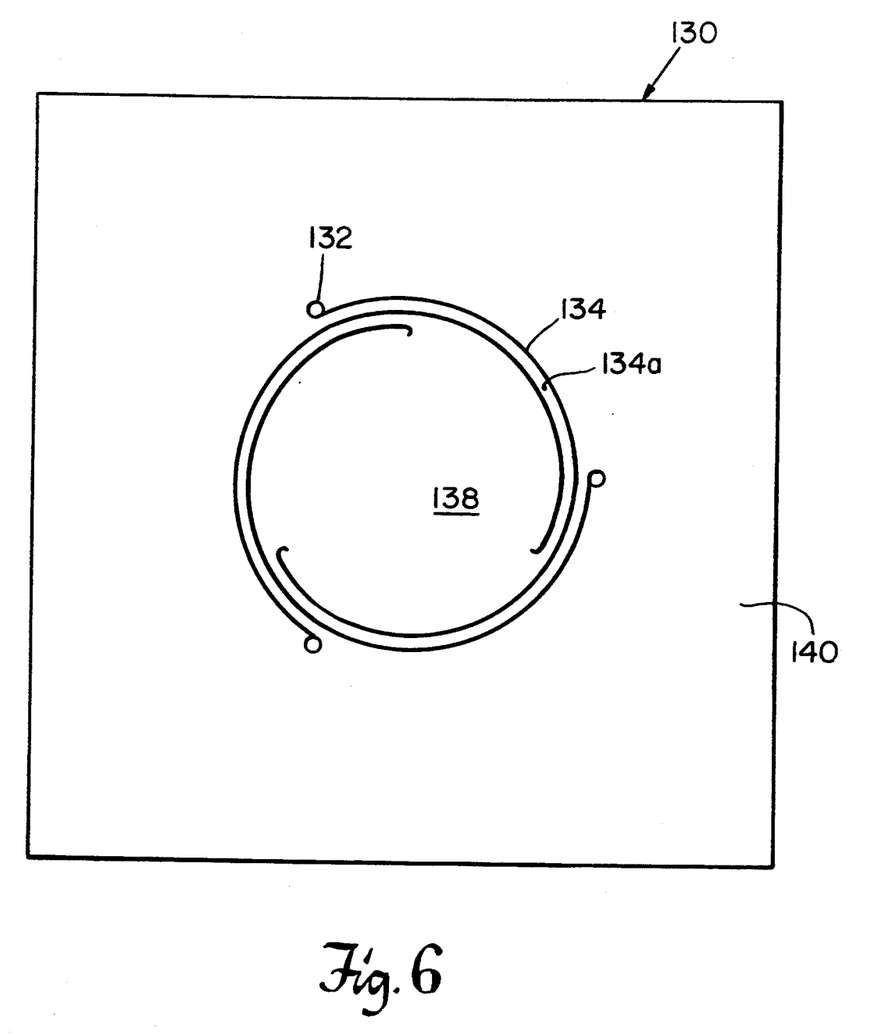
FIG. 6 is a plan view of another preferred embodiment of the multi-axis spring.

In FIG. 6, another preferred embodiment of the present invention is depicted. Multi-axis spring 130 has a series of spiral slots 134 spiraling from starter holes 132 to form a series of deflectable beams 134a. Deflectable beams 134a elastically couple the interior region 138 to the outer region 140. Although only three beams 134a are shown, a greater or lesser number of beams 134a can be employed on multi-axis spring 130.

Figure 7:
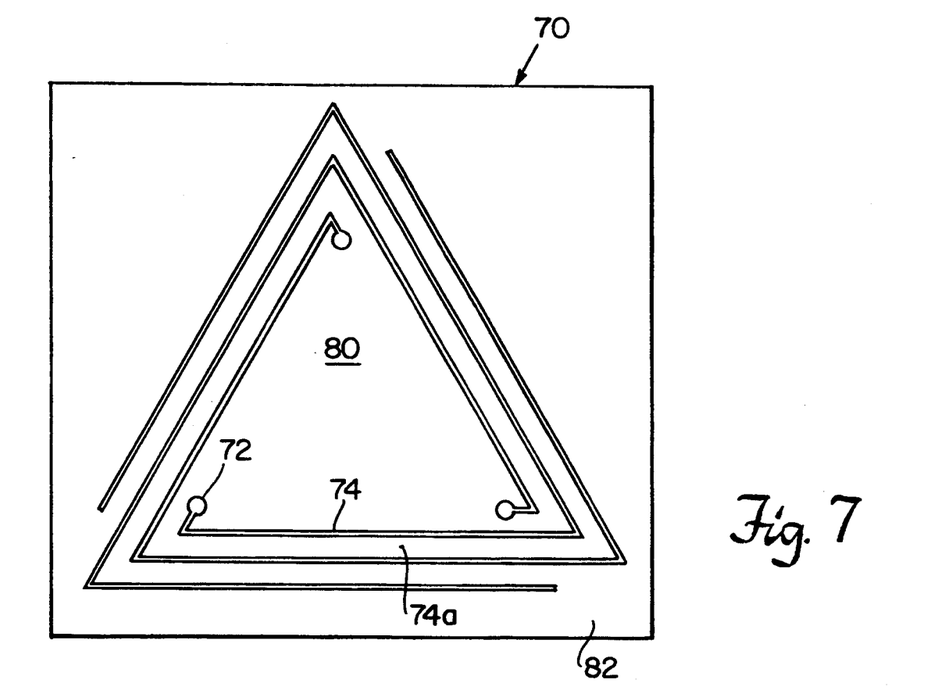
FIG. 7 is another preferred embodiment of the multi-axis spring.

FIG. 7 depicts another preferred embodiment of the present invention. Multi-axis spring 70 has a series of slots 74 originating from starter holes 72 which form a series of deflectable beams 74a surrounding interior region 80 in a triangular pattern. Beams 74a elastically couples interior region 80 to outer region 82.

Although force platform 10 has been shown to include four multi-axis springs (FIG. 2), force platform 10 can include only a single multi-axis spring 26. A single multi-axis spring employed in the force platform can have four sets of magnets and sensors within the interior region so that the single multi-axis spring can measure moments as well as forces about the x, y and z axes. Additionally, force platform 10 does not have to include multi-axis springs of the design shown, but can include multi-axis springs of other designs.

While this invention has been particularly shown and described with references to preferred embodiments thereof, it will be understood by those skilled in the art that various changes in form and details may be made therein without departing from the spirit and scope of the invention as defined by the appended claims.

We claim:

1. A multi-axis spring comprising;
a planar block of rigid material having a first region circumscribed by a plurality of non-linear deflectable beams, said beams surrounding the second region and elastically coupling the first region of the block to the second of the block such that the first region of the block is deflectable relative to the second region along multiple axes while under load, and a sensor for sensing loads on the block.

2. The multi-axis spring of claim 1 in which the sensor comprises a magnetic sensor.

3. The multi-axis spring of claim 1 in which the sensor comprises:
   a first magnet for producing a first magnetic field, the first magnet affixed relative to one region of the block; and
   a plurality of magnetic sensors positioned proximate to the first magnet and affixed relative to another region of the block for sensing magnetic fields, the intensity of the first magnetic field varying with varying distance from the first magnet, the series of sensors providing output signals in response to the intensity of the sensed magnetic field which is proportional to the distance of the magnetic sensors from the first magnet.

4. The multi-axis spring of claim 3 further comprising a second magnet for producing a second magnetic field positioned apart from the first magnet and affixed relative to the same region of the block, the first and second magnetic fields producing a resultant magnetic field between the first and second magnets which is sensed by the series of magnetic sensors.

5. The multi-axis spring of claim 4 in which the series of magnetic sensors comprises:
   two pairs of opposed magnetic sensors positioned proximate to the first and second magnets such that each magnetic sensor in a magnetic sensor pair is separated from the opposing magnetic sensor by the first and second magnets, the magnetic sensors being positioned along a plane perpendicular to an axis passing through the first and second magnets; and
   a single magnetic sensor positioned between the first and second magnets.

6. An apparatus for sensing loads along multiple axes comprising:
   a spring having a first member, for receiving loads, which is elastically coupled to a second member of the spring by an elastic member capable of deflecting along multiple axes such that the first member of the spring is capable of significant deflection relative to the second member of the spring along multiple axes while under a load;
   a first magnet for producing a first magnetic field affixed relative to one member of the spring; and
   a magnetic sensor affixed relative to another member of the spring and positioned proximate to the first magnet for sensing loads exerted on the spring by sensing the magnetic field produced by the first magnet, the intensity of the magnetic field varying with varying distance from the first magnet which varies depending upon the load exerted on the spring, the sensor providing output signals in response to the intensity of the magnetic field sensed which is proportional to the distance from the magnets, the sensor sensing loads exerted on the spring in directions along multiple axes by sensing magnetic field intensity along multiple axes.

7. The apparatus of claim 6 further comprising a second magnet for producing a second magnetic field positioned apart from the first magnet and affixed relative to the same member of the spring, the first and second magnetic fields producing a resultant magnetic field between the first and second magnets which is sensed by the magnetic sensor.

8. The apparatus of claim 7 in which the magnetic sensor comprises:
   two pairs of opposed sensor elements positioned along a plane perpendicular to an axis passing through the first and second magnets proximate to the first and second magnets such that each sensor element in a sensor element pair is separated from the opposing magnetic sensor element by the first and second magnets; and
   a single sensor element positioned between the first and second magnets.

9. The apparatus of claim 8 in which the multiple axes are x, y and z axes, with the z axis extending parallel to the axis passing through the first and second magnets.

10. The apparatus of claim 9 in which the spring constant in the z axis is greater than the spring constants in the x and y axes.

11. The apparatus of claim 6 in which the multi-axis spring comprises:
    a block of rigid material;
    a pattern of slots passing through the block to form a series of deflectable beams separated from each other by the slots, the series of deflectable beams surrounding the first member of the spring and elastically coupling the first member of the spring to the second member of the spring.

12. The apparatus of claim 11 in which the deflectable beams have straight sections.

13. The apparatus of claim 12 in which each deflectable beam has a plurality of straight sections angled relative to each other.

14. The apparatus of claim 13 in which each deflectable beam has a right angle formed in the beam.

15. The apparatus of claim 7 further comprising:
    a platform upon which loads are applied, the platform transferring the applied loads to the first region of the spring; and
    a base for supporting the second member of the spring.

16. The apparatus of claim 15 further comprising a plurality of multi-axis springs.

17. The apparatus of claim 6 in which the first member of the spring is an interior member of the spring and the second member of the spring is an outer member of the spring.

18. An apparatus for sensing loads along multiple axes comprising:
    a spring capable of deflecting along multiple axes, the spring having a first member for receiving loads, which is elastically coupled to a second member of the spring such that the first member of the spring is capable of deflecting relative to the second member of the spring along multiple axes while under a load;
    a first magnet for producing a first magnetic field affixed relative to one member of the spring;
    a second magnet for producing a second magnetic field positioned apart from the first magnet and affixed relative to the same member of the spring, the first and second magnetic fields producing a resultant magnetic field between the first and second magnets; and
    a magnetic sensor affixed relative to another member of the spring and positioned proximate to the first and second magnets for sensing loads exerted on the spring by sensing the resultant magnetic field produced by the first and second magnets, the intensity of the resultant magnetic field varying with varying distance from the first and second magnets which varies depending upon the load exerted on the spring, the sensor providing output signals in response to the intensity of the magnetic field sensed which is proportional to the distance from the magnets, the magnetic sensor comprising:

two pairs of opposed sensor elements positioned proximate to the first and second magnets such that each sensor element in a sensor element pair is separated from the opposing magnetic sensor element by the first and second magnets, the sensor elements being positioned along a plane perpendicular to an axis passing through the first and second magnets; and a single sensor element positioned between the first and second magnets.

19. The apparatus of claim 18 in which the multiple axes are x, y and z axes, with the z axis extending parallel to the axis passing through the first and second magnets.

20. The apparatus of claim 19 in which the spring constant in the z axis is greater than the spring constants in the x and y axes.

21. The apparatus of claim 18 in which the multi-axis spring comprises:

a block of rigid material;

a pattern of slots passing through the block to form a series of deflectable beams separated from each other by the slots, the series of deflectable beams surrounding the first member of the spring and elastically coupling the first member of the spring to the second member of the spring.

22. The apparatus of claim 21 in which the deflectable beams have straight sections.

23. The apparatus of claim 22 in which each deflectable beam has a plurality of straight sections angled relative to each other.

24. The apparatus of claim 23 in which each deflectable beam has a right angle formed in the beam.

25. The apparatus of claim 18 further comprising:

a platform upon which loads are applied, the platform transferring the applied loads to the first member of the spring; and a base for supporting the second member of the spring.

26. The apparatus of claim 25 further comprising a plurality of multi-axis springs.

27. The apparatus of claim 18 in which the first member of the spring is an interior member of the spring and the second member of the spring is an outer member of the spring.

* * * * *